United States Patent

Suzuki et al.

[11] Patent Number: 5,587,033
[45] Date of Patent: Dec. 24, 1996

[54] PROCESS FOR THE PREPARATION OF RADIATION IMAGE STORAGE PANELS

[75] Inventors: Hideki Suzuki; Katsuhiro Kohda, both of Kanagawa, Japan

[73] Assignee: Fuji Photo Film Co., Ltd., Kanagawa, Japan

[21] Appl. No.: 468,326

[22] Filed: Jun. 6, 1995

Related U.S. Application Data

[62] Division of Ser. No. 196,460, Feb. 15, 1994, which is a division of Ser. No. 692,649, Apr. 29, 1991, Pat. No. 5,306,367.

[30] Foreign Application Priority Data

| Apr. 27, 1990 | [JP] | Japan | 2-112505 |
| May 11, 1990 | [JP] | Japan | 2-122380 |
| Jun. 20, 1990 | [JP] | Japan | 2-161518 |

[51] Int. Cl.⁶ .......... B29C 55/06; B32B 31/20; B32B 31/26; G03C 1/00
[52] U.S. Cl. .......... 156/164; 156/67; 156/229; 156/308.2; 264/21; 264/175; 250/484.4
[58] Field of Search .......... 156/67, 246, 249, 156/312, 308.2, 229, 160, 163, 164; 264/21, 175, 120; 427/157, 365, 369, 444; 976/DIG. 439; 250/484.1 A, 484.1 B, 484.1 C, 483.1, 484.4; 252/301.4 H, 301.4 R; 430/139

[56] References Cited

U.S. PATENT DOCUMENTS

| 2,887,379 | 5/1959 | Blake et al. | 430/503 |
| 3,291,668 | 12/1966 | Goldstein | 156/67 |
| 3,617,285 | 11/1971 | Staudenmayer | 430/6 |
| 3,743,833 | 7/1973 | Martic et al. | 250/483.1 |
| 4,420,444 | 12/1983 | Yamada et al. | 264/21 |
| 4,910,407 | 3/1990 | Arakawa et al. | 156/231 X |
| 4,952,813 | 8/1990 | Miyahara et al. | 427/157 X |
| 5,024,791 | 6/1991 | Cusano et al. | 264/21 |

*Primary Examiner*—Michael W. Ball
*Assistant Examiner*—Francis J. Lorin
*Attorney, Agent, or Firm*—Sixbey, Friedman, Leedom & Ferguson; Gerald J. Ferguson, Jr.; Joan K. Lawrence

[57] ABSTRACT

A process for preparing a radiation image storage panel having a support and a stimulable phosphor layer comprises the first step of forming a phosphor sheet comprising a binder and a stimulable phosphor and the second step of compressing the phosphor sheet on the support under heating up to a temperature of not lower than softening point or melting point of the binder, using a plurality of calender rolls giving different pressure, a combination of a calender roll and a preheating means, or a combination of a calender roll and a tension-applying means.

6 Claims, 6 Drawing Sheets

PROCESS FOR THE PREPARATION OF RADIATION IMAGE STORAGE PANELS

This is a Divisional application of Ser. No. 08/196,460, filed Feb. 15, 1994, which itself is a divisional application of Ser. No. 07/692,649, filed Apr. 29, 1991, now U.S. Pat. No. 5,306,367.

BACKGROUND OF THE INVENTION

1. Field of the Invention

This invention relates to a process for preparing a radiation image storage panel which is employable in a radiation image recording and reproducing method utilizing a stimulable phosphor.

2. Description of the Prior Art

For obtaining a radiation image, there has been heretofore employed a radiography utilizing a radiographic film having a photosensitive silver halide emulsion layer in combination with a radiographic intensifying screen.

As a method replacing the above-mentioned radiography, a radiation image recording and reproducing method utilizing a stimulable phosphor as described, for example, in U.S. Pat. No. 4,239,968, has been utilized. In the radiation image recording and reproducing method, a radiation image storage panel comprising a stimulable phosphor (stimulable phosphor sheet) is used, and the method involves steps of causing the stimulable phosphor of the panel to absorb radiation energy having passed through an object or having been radiated by an object; exciting the stimulable phosphor with an electromagnetic wave such as visible light and infrared rays (namely, stimulating rays) to sequentially release the radiation energy stored in the stimulable phosphor as light emission (stimulated emission); photo-electrically detecting the emitted light to obtain electric signals; and reproducing the radiation image of the object as a visible image from the electric signals.

In the above-described radiation image recording and reproducing method, a radiation image is obtainable with a sufficient amount of information by applying a radiation to the object at a considerably small dose, as compared with the case of using the conventional radiography. Accordingly, this radiation image recording and reproducing method is of great value especially when the method is used for medical diagnosis.

The radiation image storage panel employed in the radiation image recording and reproducing method has a basic structure comprising a support and a stimulable phosphor-containing resin layer provided on one surface of the support. Further, a transparent film is generally provided on the free surface (surface not facing the support) of the stimulable phosphor-containing resin layer to keep the stimulable phosphor-containing resin layer from chemical deterioration or physical shock.

The stimulable phosphor-containing resin layer generally comprises a resinous binder and stimulable phosphor particles dispersed therein. The stimulable phosphor particles in the stimulable phosphor-containing resin layer, when excited with stimulating rays after having been exposed to a radiation such as X-rays, emit light (stimulated emission). Accordingly, the radiation having passed through an object or having been radiated by an object is absorbed by the stimulable phosphor-containing resin layer of the radiation image storage panel in proportion to the applied radiation dose, and a radiation image of the object is produced in the radiation image storage panel in the form of a radiation energy-stored image (in the form of a latent image). The radiation energy-stored image can be released as stimulated emission (in the form of light emission) by applying stimulating rays to the panel, for instance by scanning the panel with stimulating rays. The stimulated emission is then photo-electrically converted to electric signals, so as to produce a visible image from the radiation energy-stored image.

Accordingly, it is desired for the radiation image storage panel employed in the radiation image recording and reproducing method to have a high sensitivity and to provide an image of high quality (high sharpness, high graininess, etc.). In particular, from the viewpoint of obtaining more accurate and detailed information of an object, it is desired to develop a radiation image storage panel which provide an image of improved sharpness.

The sensitivity of the radiation image storage panel is essentially determined by the total amount of stimulated emission produced by the stimulable phosphor contained therein, and the total amount varies depending upon not only the emission luminance of the phosphor but also the content (i.e., amount) of the phosphor in the phosphor layer. The large content of the phosphor also results in increase of absorption of a radiation such as X-rays, so that the panel shows an increased high sensitivity and provides an image of improved quality, especially, improved graininess. On the other hand, assuming that the content of the phosphor layer is kept at the same level, a panel utilizing such a phosphor layer provides an image of high sharpness, if the phosphor layer is densely packed with the phosphor, because such phosphor layer can be made thinner to reduce spread of stimulating rays which is caused by scattering in the phosphor layer.

U.S. Pat. No. 4,910,407 describes a radiation image storage panel having a phosphor layer in which stimulable phosphor particles are densely packed by compressing the prepared phosphor layer so as to reduce the void volume of the layer.

The phosphor density in the phosphor layer of the above-mentioned panel is increased by compressing the phosphor layer, and an image provided by the panel exhibits improved sharpness as compared with one obtained by a previously known radiation image storage panel. However, with respect to the graininess, the panels sometimes relatively deteriorate.

U.S. patent application Ser. No. 07/510,679, now U.S. Pat. No. 5,164,224 describes a radiation image storage panel showing high sharpness as well as good graininess. The radiation image storage panel utilizes a thermoplastic elastomer as a binder of the stimulable phosphor layer and is prepared by compressing a phosphor layer on a support at a temperature of not lower than softening point or melting point of the thermoplastic elastomer.

SUMMARY OF THE INVENTION

Accordingly, an object of the present invention is to provide a process for preparing a radiation image storage panel which is further improved in the sharpness as well as graininess of the image provided thereby.

There is provided by the present invention a process (1) for the preparation of a radiation image storage panel comprising the steps of:

forming a phosphor sheet comprising a binder and a stimulable phosphor; and compressing the phosphor sheet on a support under heating up to a temperature of not lower than softening point or melting point of the binder, at least twice, by means of a calender roll first at a low pressure and second at a high pressure, so as to fix the phosphor sheet onto the support.

There is also provided by the invention a process (2) for the preparation of a radiation image storage panel comprising the steps of:

forming a phosphor sheet comprising a binder and a stimulable phosphor;

heating the phosphor sheet on a support; and compressing the heated phosphor sheet on the support under heating or maintaining the heated phosphor sheet at a temperature of not lower than softening point or melting point of the binder, by means of a calender roll, so as to fix the phosphor sheet onto the support.

There is further provided by the invention a process (3) for the preparation of a radiation image storage panel comprising the steps of:

forming a phosphor sheet comprising a binder and a stimulable phosphor; and compressing the phosphor sheet on a support under heating up to a temperature of not lower than softening point or melting point of the binder by means of a heated calender roll, keeping the phosphor sheet under tension.

DETAILED DESCRIPTION OF THE INVENTION

Figure 1:
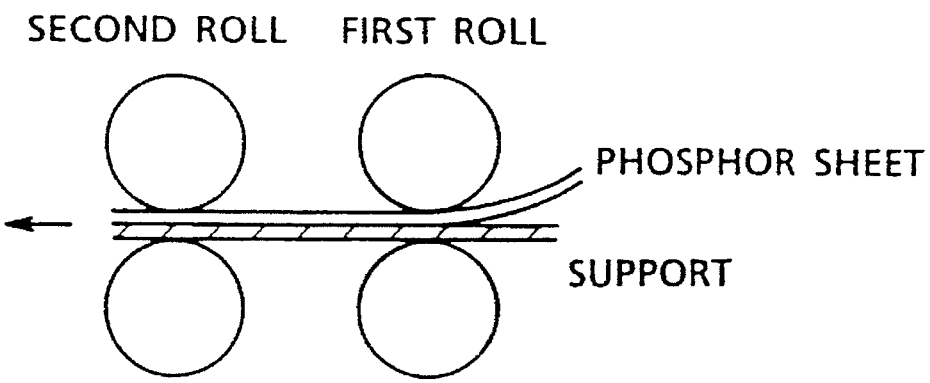
FIG. 1 shows a schematic view of a heating-compression system comprising two sets of calender rolls which is employable for performing the compression step of the process (1) for the preparation of a radiation image storage panel according to the present invention.

In the processes of the invention, the phosphor sheet formed for the lamination on a sheet is compressed and affixed simultaneously on the support at a temperature not lower than softening point or melting point of the binder of the phosphor layer. The crystalline phosphor dispersed in the binder of the phosphor sheet can move somewhat freely within the phosphor sheet during the compression treatment. Therefore, the pressure applied onto the phosphor sheet further serves to extend the sheet gradually on the support to give a relatively thin phosphor layer even if a relatively high pressure is applied.

Consequently, by utilizing the processes of the invention, void volume of a phosphor layer of a radiation image storage panel is lowered without destruction of the phosphor, and a phosphor layer which has a relatively thin thickness and accordingly is able to give a radiation image with enhanced sharpness is easily obtained.

The processes (1), (2) and (3) for the preparation of a radiation image storage panel according to the present invention all comprise two steps, namely, the first step for the preparation of a phosphor sheet, and the second step (or further the third step) for fixing the phosphor sheet onto a support by compressing the phosphor sheet with heating under different conditions.

The processes of the invention are described in more detail below.

The first step is for forming a phosphor sheet comprising a binder and a stimulable phosphor.

The phosphor layer of the radiation image storage panel comprises a resinous binder and stimulable phosphor particles dispersed therein.

The stimulable phosphor, as described hereinbefore, gives stimulated emission when excited by stimulating rays after exposure to a radiation. In the viewpoint of practical use, the stimulable phosphor is desired to give stimulated emission when excited by stimulating rays in the wavelength region of 400–850 nm.

Examples of the stimulable phosphor employable in the radiation image storage panel of the present invention include:

SrS:Ce;Sm; SrS:Eu,Sm; ThO$_2$:Er, and La$_2$O$_2$S:Eu,Sm; as described in U.S. Pat. No. 3,859,527;

ZnS:Cu,Pb; BaO·xAl$_2$O$_3$:Eu, in which x is a number satisfying the condition of $0.8 \leq x \leq 10$, and M$^{2+}$O·xSiO$_2$:A, in which M$^{2+}$ is at least one divalent metal selected from the group consisting of Mg, Ca, St, Zn, Cd and Ba, A is at least one element selected from the group consisting of Ce, Tb, Eu, Tin, Pb, Tl, Bi and Mn, and x is a number satisfying the condition of $0.5 \leq x \leq 2.5$, as described in U.S. Pat. No. 4,326,078;

(Ba$_{1-x-y}$,Mg$_x$,Ca$_y$)FX:aEu$^{2+}$, in which X is at least one element selected from the group consisting of Cl and Br, x and y are numbers satisfying the conditions of $00 < x+y \leq 0.6$, and $xy \approx 0$, and a is a number satisfying the condition of $10^{-6} \leq a \leq 5 \times 10^{-2}$, as described in Japanese Patent Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$, as described in the above-mentioned U.S. Pat. No. 4,236,078;

(Ba$_{1-x}$,M$''_x$)FX:yA, in which M$''$ is at least one divalent metal selected from the group consisting of Mg, Ca, St, Zn and Cd, X is at least one element selected from the group consisting of Cl, Br and I, A is at least one element selected from the group consisting of Eu, Tb, Ce, Tm, Dy, Pr, Ho, Md, Yb and Er, and x and y are numbers satisfying the conditions of $0 \leq x \leq 0.6$ and $0 \leq y \leq 0.2$, respectively, as described in Japanese Patent Provisional Publication No. 55(1980)-12145;

$M''FX \cdot xA:yLn$, in which $M''$ is at least one element selected from the group consisting of Ba, Ca, St, Mg, Zn and Cd; A is at least one compound selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; Ln is at least one element selected from the group consisting of Eu, Tb, Ce, Tin, Dy, Pr, Ho, Nd, Yb, Er, Sm and Gd; X is at least one element selected from the group consisting of Cl, Br and I; and x and y are numbers satisfying the conditions of $5 \times 10^{-5} \leq x \leq 0.5$ and $0 < y \leq 0.2$, respectively, as described in Japanese Patent Provisional Publication No. 55(1980)-160078;

$(Ba_{1-x}M''_x)F_2 \cdot aBaX_2:yEu,zA$, in which $M''$ is at least one element selected from the group consisting of Be, Mg, Ca, Sr, Zn and Cd; X is at least one element selected from the group consisting of Cl, Br and I; A is at least one element selected from the group consisting of Zr and Sc; and a, x, y and z are numbers satisfying the conditions of $0.5 \leq a \leq 1.25$, $0 \leq x \leq 1$, $10^{-6} \leq y \leq 2 \times 10^{-1}$, and $0 < z \leq 10^{-2}$ respectively as described in Japanese Patent Provisional Publication No. 56(1981)-116777;

$(Ba_{1-x}M''_x)F_2 \cdot aBaX_2:yEu,zB$, in which $M''$ is at least one element selected from the group consisting of Be, Mg, Ca, St, Zn and Cd; X is at least one element selected from the group consisting of Cl, Br and I; and a, x, y and z are numbers satisfying the conditions of $0.5 \leq a \leq 1.25$, $0 \leq x \leq 1$, $10^{-6} \leq y \leq 2 \times 10^{-1}$, and $0 < z \leq 2 \times 10^{-1}$, respectively as described in Japanese Patent Provisional Publication No. 57(1982)-23673;

$(Ba_{1-x}M''_x)F_2 \cdot aBaX_2:yEu,zA$, in which $M''$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5 \leq a \leq 1.25$, $0 \leq x \leq 1$, $10^{-6} \leq y \leq 2 \times 10^{-1}$, and $0 < z \leq 5 \times 10^{-1}$, respectively, as described in Japanese Patent Provisional Publication No. 57(1982)-23675;

$M'''OX:xCe$, in which $M'''$ is at least one trivalent metal selected from the group consisting of Pr, Nd, Pm, Sm, Eu, Tb, Dy, Ho, Er, Tm, Yb, and Bi; X is at least one element selected from the group consisting of Cl and Br; and x is a number satisfying the condition of $0 < x < 0.1$, as described in Japanese Patent Application No. 56(1981)-167498 ;

$Ba_{1-x}M_{x/2}L_{x/2}FX:yEu^{2+}$ in which M is at least one alkali metal selected from the group consisting of Li, Na, K, Rb and Cs; L is at least one trivalent metal selected from the group consisting of Sc, Y, La, Ce, Pr, Nd, Pro, Sin, Gd, Tb, Dy, Ho, Er, Tin, Yb, Lu, Al, Ga, In and Tl; X is at least one halogen selected from the group consisting of Cl, Br and I; and x and y are numbers satisfying the conditions of $10^{-2} \leq x \leq 0.5$ and $0 < y \leq 0.1$, respectively;

$BaFX \cdot xA:yEu^{2+}$, in which X is at least one halogen selected from the group consisting of Cl, Br and I; A is at least one fired product of a tetrafluoroboric acid compound: and x and y are numbers satisfying the conditions of $10^{-6} \leq x \leq 0.1$ and $0 < y \leq 0.1$, respectively;

$BaFX \cdot xA:yEu^{2+}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6} \leq x \leq 0.1$ and $0 < y \leq 0.1$, respectively;

$BaFX \cdot xNaX':aEu^{2+}$, in which each of X and X' is at least one halogen selected from the group consisting of Cl, Br and I; and x and a are numbers satisfying the conditions of $0 < x \leq 2$ and $0 < a \leq 0.2$, respectively;

$M''FX \cdot xNaX':yEu^{2+}:zA$, in which $M''$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0 < x \leq 2$, $0 < y \leq 0.2$ and $0 < z \leq 10^{-2}$ respectively; and $M''FX \cdot aM'X' \cdot bM''_2 \sqrt{c}M'''X'''_3 \cdot xA:yEu^{2+}$, in which $M''$ is at least one alkaline earth metal selected from the group consisting of Ba, Sr and Ca; $M'$ is at least one alkali metal selected from the group consisting of Li, Na, K, Rb and Cs; $M'''$ is at least one divalent metal selected from the group consisting of Be and Mg; $M'''$ is at least one trivalent metal selected from the group consisting of Al, Ga, In and Tl; A is at least one metal oxide; X is at least one halogen selected from the group consisting of Cl, Br and I; each of X', X" and X'" is at least one halogen selected from the group consisting of F, Cl, Br and I; a, b and c are numbers satisfying the conditions of $0 \leq a \leq 2$, $0 \leq b \leq 10^{-2}$, $0 \leq c \leq 10^{-2}$ and $a+b+c \geq 10^{-6}$; and x and y are numbers satisfying the conditions of $0 < x \leq 0.5$ and $0 < y \leq 0.2$, respectively.

The above-described stimulable phosphors are given by no means to restrict the stimulable phosphor employable in the present invention. Any other phosphors can be also employed, provided that the phosphor gives stimulated emission when excited with stimulating Pays after exposure to a radiation.

The stimulable phosphor in a powder form is well mixed with a resinous binder in an appropriate solvent to give a coating dispersion which contains stimulable phosphor particles uniformly dispersed in a binder solution.

Preferred examples of the resinous binder to be used for the preparation of the phosphor sheet include thermoplastic elastomers which have elasticity at room temperatures and show flowability when they are heated, such as polystyrene, polyolefin, polyurethane, polyester, polyamide, polybutadiene, ethylene-vinyl acetate copolymer, polyvinyl chloride, natural rubber, fluorocarbon rubber, polyisoprene, chlorinated polyethylene, styrene-butadiene rubber, and silicone rubber.

Preferably, the thermoplastic elastomers have softening or melting points in the range of 30° C. to 300° C. More preferably, the thermoplastic elastomers have softening or melting points in the range of 30° C. to 200° C. Most preferably, the thermoplastic elastomers have softening or melting points in the range of 30° C. to 150° C.

Examples of the solvents employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixtures of the above-mentioned compounds.

The ratio between the binder and the phosphor in the coating dispersion may be determined according to the characteristics of the aimed radiation image storage panel and natures of the phosphor and binder employed. Generally, the ratio is within the range of from 1:1 to 1:100 (binder:phosphor, by weight), preferably from 1:8 to 1:40.

The coating dispersion may contain a dispersing agent to assist dispersibility of the phosphor particles therein, and also may contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and binder prepared is then applied uniformly onto a surface of a false support (temporary support) to form a layer of the coating dispersion. The coating procedure can be carried out by a conventional method such as a method using a doctor blade, a roll coater or a knife coater.

The false support can be selected from the support materials known for radiation image storage panels. Examples of the support materials include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. The false support also can be prepared by a sheet of ceramics such as alumina, titania, zirconia or magnesia, a glass sheet, or a metal sheet. Preferably, the false sheet has a releasing layer on the surface so that the formed phosphor sheet can be readily peeled off.

After applying the coating dispersion to the false support, the coating dispersion is then heated slowly to dryness so as to complete the formation of a phosphor sheet. Thickness of the phosphor sheet varies depending upon the characteristics of the aimed radiation image storage panel, the nature of the phosphor, the ratio between the binder and the phosphor, etc. Generally, the thickness of the phosphor layer is within a range of from 20 μm to 1 mm, preferably from 50 to 500 μm.

Subsequently thus formed phosphor sheet is fixed on a genuine support by applying pressure and heat to the phosphor sheet in the second step.

The material of the genuine support can be the same as that of the false support. However, a plastic film is preferably employed as the support material. The plastic film may contain a light-absorbing material such as carbon black, or may contain a light-reflecting material such as titanium dioxide.

In the preparation of a known radiation image storage panel, one or more additional layers are occasionally provided between the support and the phosphor layer so as to enhance the adhesion between the support and the phosphor layer, or to improve sensitivity of the panel or the quality of an image provided thereby. For instance, a subbing layer or an adhesive layer may be provided by coating polymer material such as gelatin over the surface of the support on the phosphor layer side. Otherwise, a light-reflecting layer or a light-absorbing layer may be provided by forming a polymer material layer containing a light-reflecting material such as titanium dioxide or a light-absorbing material such as carbon black. In the invention, one or more of these additional layers may be provided depending on the type of the radiation image storage panel.

The phosphor layer side surface of the support (or the surface of adhesive layer, light-reflecting layer, or light-absorbing layer in the case where such layers provided on the phosphor layer) may be provided with protruded and depressed portions for enhancement of the sharpness of radiation image, and the constitution of those protruded and depressed portions can be selected depending on the purpose of the radiation image storage panel.

The second step of the process (1) is now described by referring to FIG. 1 of the attached drawings.

The phosphor sheet prepared in the first step (1) is placed on a support and compressed under heating, by means of a calender roll first at a low pressure and second at a high pressure. The compression under heating is generally performed using at least two sets of calender rolls, namely, a first roll for application of a relatively low pressure and a second roll for application of a relatively high pressure. By the compression processing, the phosphor sheet is made thinner and fixed to the support. In addition to these sets of calender rolls, other calender rolls or any other apparatus can be employed, if desired.

The conditions for the compression processing under heating can be varied depending on nature of the binder, thickness of the phosphor sheet, etc., but are generally set to a pressure of 10–1,000 kg/cm$^2$ and a temperature of 30°–200° C. for the first roll, and to a pressure of 50–2,000 kg/cm$^2$ and a temperature of 30°–200° C. for the second roll. Each of the first roll and second roll generally consists of two rolls as is illustrated in FIG. 1, and the temperature for the first and second rolls means an average temperature of these two rolls.

In the second step of the process (1), the pressure applied by the first roll is lower than that applied by the second roll. The difference between the pressure of the first roll and that of the second roll preferably ranges 10 to 1,000 kg/cm$^2$, more preferably ranges 50 to 500 kg/cm$^2$. The temperature of the first roll generally is the same as or lower than the temperature of the second roll. But, the temperature of the first roll may be higher than the temperature of the second roll, provided that the difference of temperature does not exceed 30° C. In any case, the highest temperature should exeed the softening or melting temperature of the resinous binder of the phosphor sheet.

The calender rolls can be selected from those used for the preparation of magnetic recording tapes or similar calender rolls. As is mentioned above, the calender roll generally consists of two rolls. These two rolls may consist of two metal rolls, two rubber rolls, or a metal roll and a rubber roll. The combined structure of the phosphor sheet and the support is passed through between these two rolls at the predetermined pressure.

The second and third steps of the process (2) are now described by referring to FIGS. 3–6 of the attached drawings.

The phosphor sheet prepared in the first step is placed on a support and pre-heated, and then it is subjected to the compressing step.

Figure 3:
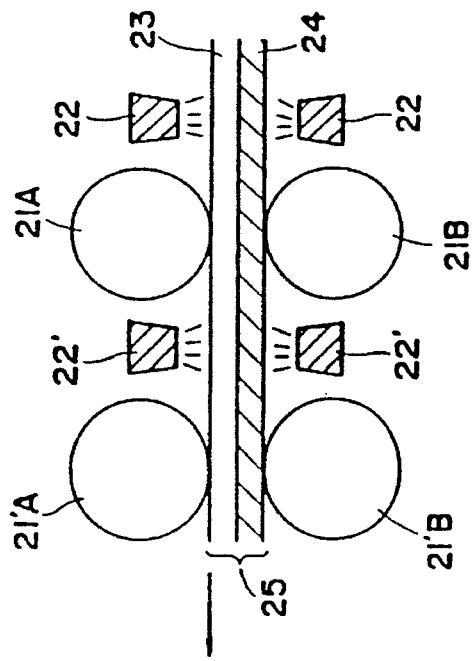
FIGS. 3 to 6 show schematic views of heating-compression systems comprising one or more sets of calender rolls and preheating means which are employable for performing the compression step of the process (2) for the preparation of a radiation image storage panel according to the present invention.

In FIG. 3, a composite body 15 consisting of a phosphor sheet 13 and a support 14 is preheated by means of a heater 12 and then compressed by a set of calender rolls 11A, 11B under heating or keeping the composite at the temperature raised by the heater 12. By this compression processing, the phosphor sheet 13 is fixed on the support 14. Examples of the heater include a far-infrared heater or a hot air heater. In FIG. 3, a set of two heaters are employed. However, the preheating can be done using only one heater which is preferably arranged on the phosphor sheet side.

Figure 4:
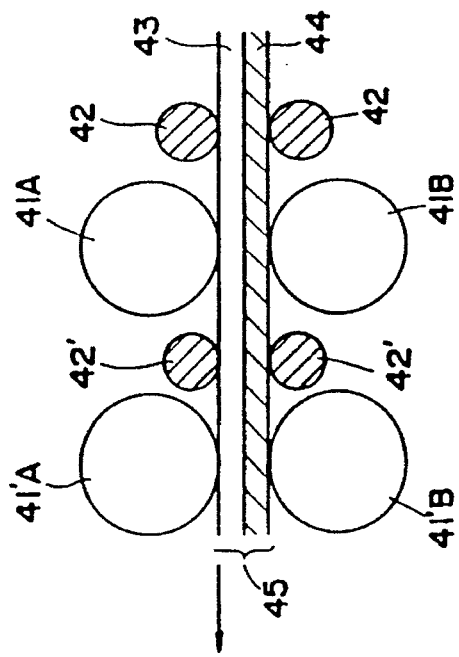

For the compression processing, two sets of calender rolls can be employed as is illustrated in FIG. 4. In FIG. 4, a composite body 25 consisting of a phosphor sheet 23 and a support 24 is preheated by a heater 22 and then compressed by first calender rolls 21A, 21B under heating or keeping the heated condition. Thus compressed composite body 25 is again heated by a heater 22' and then again compressed by second calender rolls 21'A, 21'B. By these processing, the phosphor sheet 23 is firmly fixed onto the support 24. In addition to these heating means and calender rolls, other calender rolls or any other apparata can be employed, if desired.

Figure 5:
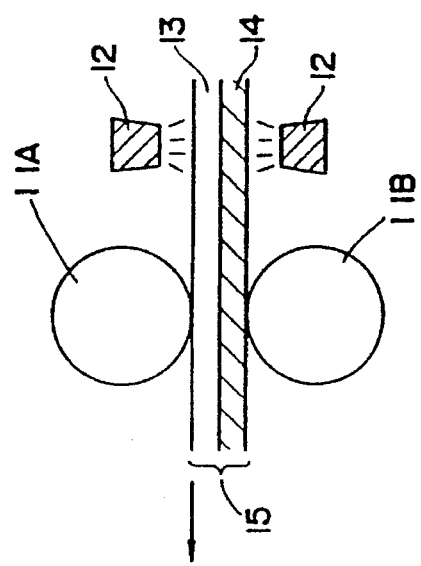

FIG. 5 illustrates use of a set of heat rollers 32 as the heating means for heating a composite body 35 of a phosphor sheet 33 and a support 34. Thus heated composite body 35 is then compressed by means of a set of calender rolls 31A, 31B.

Figure 6:
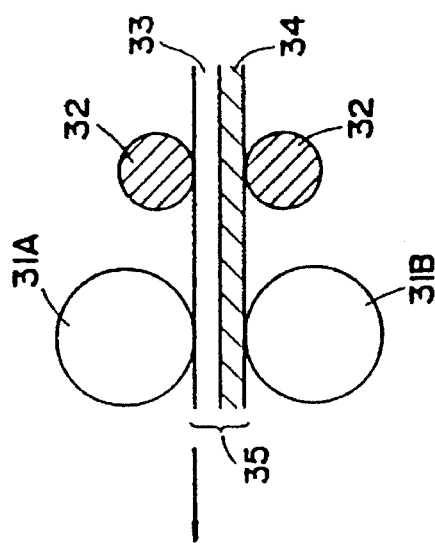

FIG. 6 illustrates use of two sets of heat rollers 42, 42' and two sets of calender rolls 41A, 41B, 41'A, 41'B. A composite body 45 of a phosphor sheet 43 and a support 44 is first heated by heater 42 and compressed by calender rolls 41A, 41B, and again heated by heaters 42' and finally compressed by calender rolls 41'A, 41'B.

The preheating by heating means preferably raises the temperature of the phosphor sheet to not lower than 20° C. below the softening or melting temperature of the resinous binder but not higher than 50° C. above the softening or melting temperature of the binder.

The conditions for the compression processing are generally set to a pressure of 50 kg/cm² or higher, where the compression processing is performed once as is illustrated in FIGS. 3 and 5. In the case of using two sets of calender rolls are used as is illustrated in FIGS. 4 and 6, the pressures for the compression are set to 10–1,000 kg/cm² for the first roll and 50–2,000 kg/cm², for the second roll.

Examples of the calender rolls are set forth in the description of the second step of the process (1).

Figure 7:
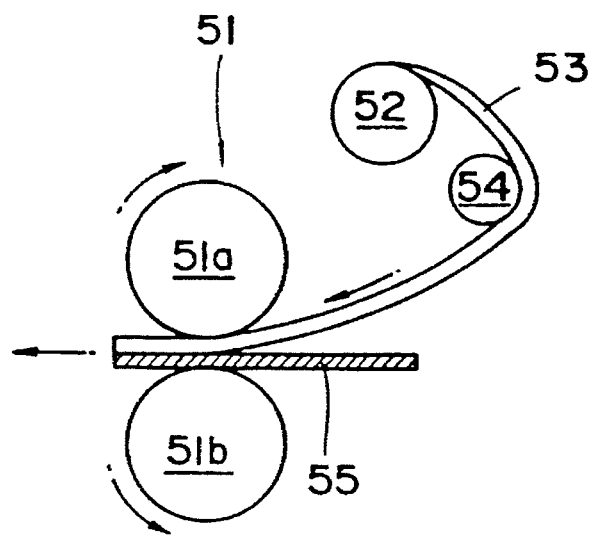
FIG. 7 shows a schematic view of a heating-compression system comprising a set of calender rolls and means for applying tension to the phosphor sheet which is employable for performing the compression step of the process (3) for the preparation of a radiation image storage panel according to the present invention.
Figure 8:
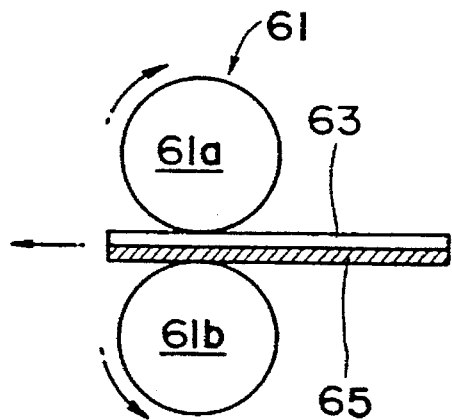
FIG. 8 shows a schematic view of a known heating-compression system comprising one set of calender rolls but not being equipped with means for applying tension to the phosphor sheet which is generally employed for performing a compression step.

The second step of the process (3) is now described by referring to FIG. 7 of the attached drawings.

The phosphor sheet prepared in the first step is placed on a support and then compressed under heating up to a temperature of not lower than softening point or point of the binder by means of a heated calender roll, keeping the phosphor sheet under tension.

In FIG. 7, a calender roll 51 comprises a roll 51a (upper roll) and a roll 51b (lower roll) and further has a torque roll 52 which serves to give a tension to a phosphor sheet. Around the torque roll 52, a phosphor sheet 53 which was prepared in the first step is wound. Due to predetermined difference of rotation rate, rotation timing between the torque roll 52 and the calender roll 51, a desired tension (weight) is given to the phosphor sheet 53. The tension or weight given to the phosphor sheet 53 can be detected by means of a tension detector such as a tension pick-up roll 54. Thus detected tension value is transmitted to the calender roll 51 and/or the torque roll 12 to control the rotation conditions of these rolls.

According to FIG. 7, a phosphor sheet 53 and a support 54 is combined just before these are introduced into the calender roll 51. Examples of the calender roll are described hereinbefore.

The conditions for the compression processing using the calender roll are generally set to a pressure of 50–2,000 kg/cm² and to a temperature of 80°–200° C.

The tension (or weight) applied to the phosphor sheet is generally so set as to give an elongation ratio in the range of 1–150% (preferably 5–50%). This means that the length of the untreated phosphor sheet is prolonged to a length as much as 1.01 to 2.5 times (preferably 1.05 to 1.5 times) when it is processed by the compression under heating and tension. For giving such elongation condition, the tension applied to the phosphor sheet is preferably adjusted to a value in the range of 10–700 g/cm (preferably 20–500 g/cm). However, the preferred tension ranges may vary depending on nature and thickness of the phosphor sheet.

The void volume of the stimulable phosphor-containing resin layer (i.e., phosphor layer) formed on the support in the above-described manners can be calculated theoretically by the following formula (I), $$\frac{V_{air}}{V} = \frac{(a+b)\rho x \rho y\, V - A(a\rho y + b\rho x)}{V((a+b)\rho x \rho y - a\rho y \rho_{air} - b\rho x \rho_{air})}$$

in which V is a total volume of the phosphor layer; Vair is a volume of air contained in the phosphor layer; A is a total weight of the phosphor; ρx is a density of the phosphor; ρy is a density of the binder; ρair is a density of air; a is a weight of the phosphor; and b is a weight of the binder.

In the formula (I), ρair is nearly 0. Accordingly, the formula (I) can be approximately rewritten in the form of the following formula (II):

$$\frac{V_{air}}{V} = \frac{(a+b)\rho x \rho y\, V - A(a\rho y + b\rho x)}{V((a+b)\rho x \rho y)}$$

in which V, Vair, A, ρx, ρy, a and b have the same meanings as defined in the formula (I).

The void volume of the phosphor layer is expressed by a value calculated according to the formula (II).

The radiation image storage panel generally has a transparent film on a free surface of a phosphor layer to protect the phosphor layer from physical and chemical deterioration. In the radiation image storage panel of the present invention, it is preferable to provide a transparent film for the same purpose.

The transparent film can be provided onto the phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided onto the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within the range of approx. 0.1 to 20 μm.

The following examples further illustrate the present invention, but these examples are by no means understood to restrict the invention.

EXAMPLE 1

In a mixture solvent of methyl ethyl ketone and 2-propanol (1:1), 200 g of a particulate divalent europium activated barium fluorobromoiodide stimulable phosphor ($BaFBr_{0.9}I_{0.1}:Eu^{2+}$), 22.5 g of a resinous binder (polyurethane elastomer, Desmolack TPKL-5-2625 (solid content: 40%), available from Sumitomo Byer Urethane Co., Ltd.) and 1.0 g of an anti-yellowing agent (epoxy resin, Epicoat 1007, available from Yuka Shell Epoxy Co., Ltd.) were dispersed using a propeller agitator to give a coating composition (binder/phosphor=1/20) having a viscosity of 30 PS (at 25° C.). The coating composition was coated on a polyethylene terephthalate sheet (false support, thickness: 180 μm) having a silicone-type release agent layer thereon. The coated composition was dried and peeled off from the false support to give a phosphor sheet. The vicar softening temperature of the binder was 45° C. (ASTM D1525).

Independently, a coating composition for the formation of a light-reflecting layer was prepared by dispersing 214 g of BaFBr (90% of particles had particle sizes within the range of 1–5 μm), 25.7 g (as solid content) of soft acrylic resin, 10.7 g of epoxy resin and 64 g of nitrocellulose (nitration degree: 11.5%, solid content: 10 wt. %) in methyl ethyl ketone by a propeller agitator to give a coating composition having a viscosity of 25–35 PS (at 25° C.).

Further, a coating composition for the formation of a undercoating layer was prepared by mixing 90 g (as solid content) of soft acrylic resin and 50 g of nitrocellulose in methyl ethyl ketone to give a coating composition having a viscosity of 3–6 PS (at 25° C.).

The coating dispersion for undercoating layer was uniformly coated over a polyethylene terephthalate sheet (genuine support, thickness; 300 μm) placed horizontally on a glass plate. The coating procedure was carried out using a doctor blade. The support having the coated layer was then heated to a temperature gradually rising from 25° to 100° C. Thus, a sheet consisting of a support and a undercoating layer (thickness: 15 μm) was made. Over the undercoating layer of the prepared sheet was coated and heated the coating composition for light-reflecting layer in the same manner as above to form a light-reflecting layer (thickness: 60 μm) on the sheet. Thus, a support sheet having the undercoating layer and light-reflecting layer was prepared.

On the support sheet was placed the phosphor sheet, and the resulting composite body was compressed by means of two sets of calender rolls (first roll and second roll) made of iron as illustrated in FIG. 1, under the following conditions.

|  | First Roll | Second Roll |
| --- | --- | --- |
| Roll Temperature |  |  |
| (Upper Roll) | 50° C. | 90° C. |
| (Lower Roll) | 50° C. | 90° C. |
| Pressure applied | 100 kg/cm² | 500 kg/cm² |
| Feed Rate | 0.2 m/min. | 0.2 m/min. |

By the compression processing, the phosphor sheet was firmly fixed on the light-reflecting layer of the support.

On the phosphor layer was placed a transparent polyethylene terephthalate film (thickness: 10 μm; provided with a polyester andhesive layer) to combine the transparent film and the phosphor layer through the adhesive layer.

Thus, a radiation image storage panel having the phosphor layer on a support was prepared.

Comparison Example 1

Figure 2:
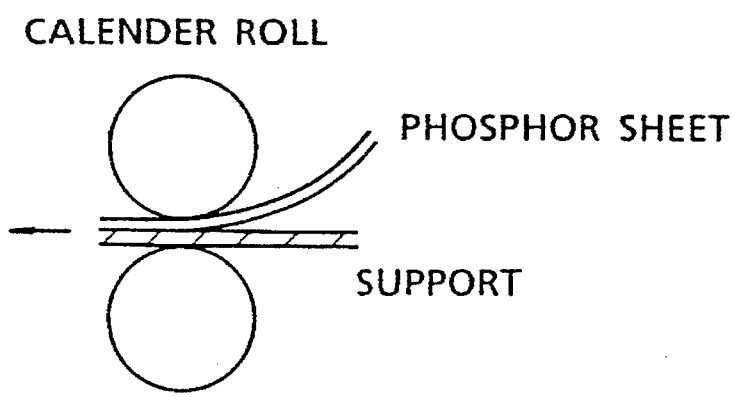
FIG. 2 shows a schematic view of a known heating-compression system comprising one set of calender rolls which is generally employed for performing a compression step.

The procedure of Example 1 was repeated except that the compression processing was performed using one set of calender rolls made of iron as shown in FIG. 2 under the conditions of temperatures of upper and lower rolls at 70° C., a pressure of 600 kg/cm² and a feed rate of 0.2 m/min.

Thus, a radiation image storage panel having the phosphor layer on a support was prepared.

In the compression processing, it was observed that the phosphor sheet sometimes adhered to the surface of the upper roll.

Comparison Example 2

The procedure of Example 1 was repeated except that the compression processing was performed using one set of calender rolls made of iron as shown in FIG. 2 (same as that of Comparison Example 1) under the conditions of temperatures of upper and lower rolls at 90° C., a pressure of 600 kg/cm² and a feed rate of 0.2 m/min.

Thus, a radiation image storage panel having the phosphor layer on a support was prepared.

In the compression processing, it was also observed that the phosphor sheet sometimes adhered to the surface of the upper roll.

EXAMPLE 2

The procedure of Example 1 was repeated using the same calender rolls except that the compression processing was performed under the following conditions.

|  | First Roll | Second Roll |
| --- | --- | --- |
| Roll Temperature |  |  |
| (Upper Roll) | 70° C. | 110° C. |
| (Lower Roll) | 70° C. | 110° C. |
| Pressure applied | 100 kg/cm² | 400 kg/cm² |
| Feed Rate | 1 m/min. | 1 m/min. |

Thus, a radiation image storage panel having the phosphor layer on a support was prepared.

Comparison Example 3

The procedure of Example 1 was repeated except that the compression processing was performed using one set of calender rolls made of iron as shown in FIG. 2 under the conditions of temperatures of upper and lower rolls at 80° C., a pressure of 500 kg/cm² and a feed rate of 1 m/min.

Thus, a radiation image storage panel having the phosphor layer on a support was prepared.

In the compression processing, it was observed that the phosphor sheet sometimes adhered to the surface of the upper roll.

Evaluation of Radiation Image Storage Panel

The radiation image storage panels prepared as described above were evaluated on the quality of the image according to the following test.

The radiation image storage panel was exposed to X-rays at voltage of 80 KVp through an MTF chart and subsequently scanned with He-Ne laser beam (wavelength: 632.8 nm) to excite the phosphor. The light emitted by the phosphor layer was detected and converted to the corresponding electric Signals by means of a photosensor. The electric signals were reproduced by an image reproducing apparatus to obtain a visible image on a recording apparatus, and the modulation transfer function (MTF) value of the visible image was determined. The MTF value was given as a value (%) at the spacial frequency of 2 cycle/min. Further, a graininess at 0.1 mR (RMS) was determined. The results are graphically shown in FIG. 9.

Figure 9:
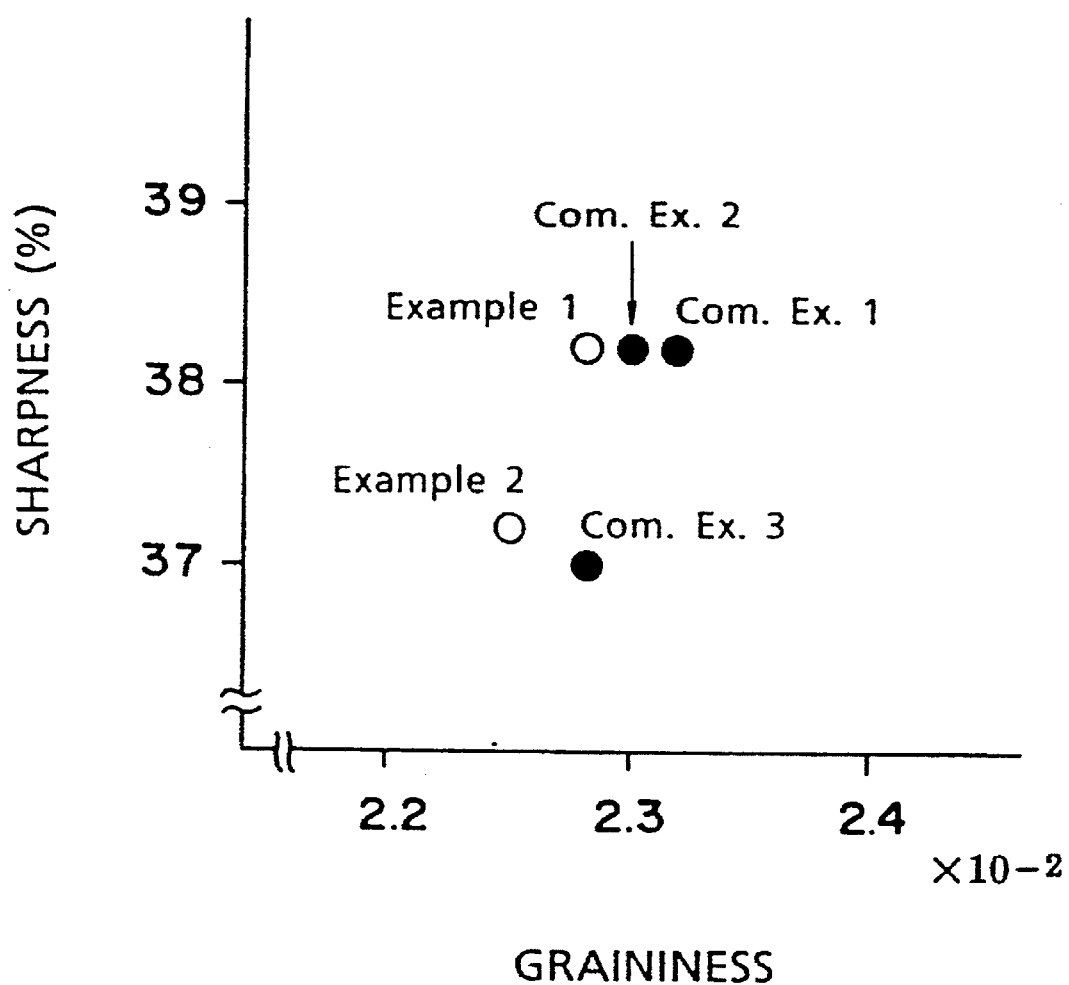
FIGS. 9 to 11 graphically show relationships between graininess and sharpness of radiation images given by the radiation image storage panels which are described in the working examples.

In FIG. 9, the degree of sharpness (in terms of MTF value at spacial frequency 2 cycle/mm) is plotted on the ordinate, wherein a larger value means a higher sharpness. The degree of graininess is plotted on the abscissa, wherein larger value means a worse graininess.

As is apparent from FIG. 9, the radiation image storage panels prepared by the present invention give improved graininess, as compared with the radiation image storage panels prepared using one set of calender rolls under similar heating condition, while the sharpness are kept essentially on the same level.

EXAMPLE 3

The procedure of Example 1 was repeated except that the compression processing was performed using one set of calender rolls and a far-infrared heater as shown in FIG. 3 at a roll pressure of 600 kg/cm$^2$ and a feed rate of 2 m/min. The temperature of the phosphor sheet after the heating was measured by inserting a thermocouple (possible measurement error: ±10° C.) between the phosphor sheet and the support. The temperature was 70° C. The compressed phosphor sheet had a thickness of 170 μm.

Thus, a radiation image storage panel having the phosphor layer on a support was prepared.

EXAMPLE 4

The procedure of Example 3 was repeated except that the roll pressure was changed to 500 kg/cm$^2$ to give a compressed sheet of 185 μm, to prepare a radiation image storage panel having the phosphor layer on a support.

Comparison Example 4

The procedure of Example 3 was repeated except that the far-infrared heaters 12 were swiched off but the lower roll 11B was heated to 70° C., to prepare a radiation image storage panel having the phosphor layer on a support.

Comparison Example 5

The procedure of Example 4 was repeated except that the far-infrared heaters 12 were swiched off but the lower roll 11B was heated to 70° C., to prepare a radiation image storage panel having the phosphor layer on a support.

Comparison Example 6

The procedure of Comparison Example 4 was repeated except that the feed rate was changed to 0.2 m/min., to prepare a radiation image storage panel having the phosphor layer on a support.

Evaluation of Radiation Image Storage Panel

The radiation image storage panels prepared as described above were evaluated on the quality of the image according to the same tests as described above.

Figure 10:
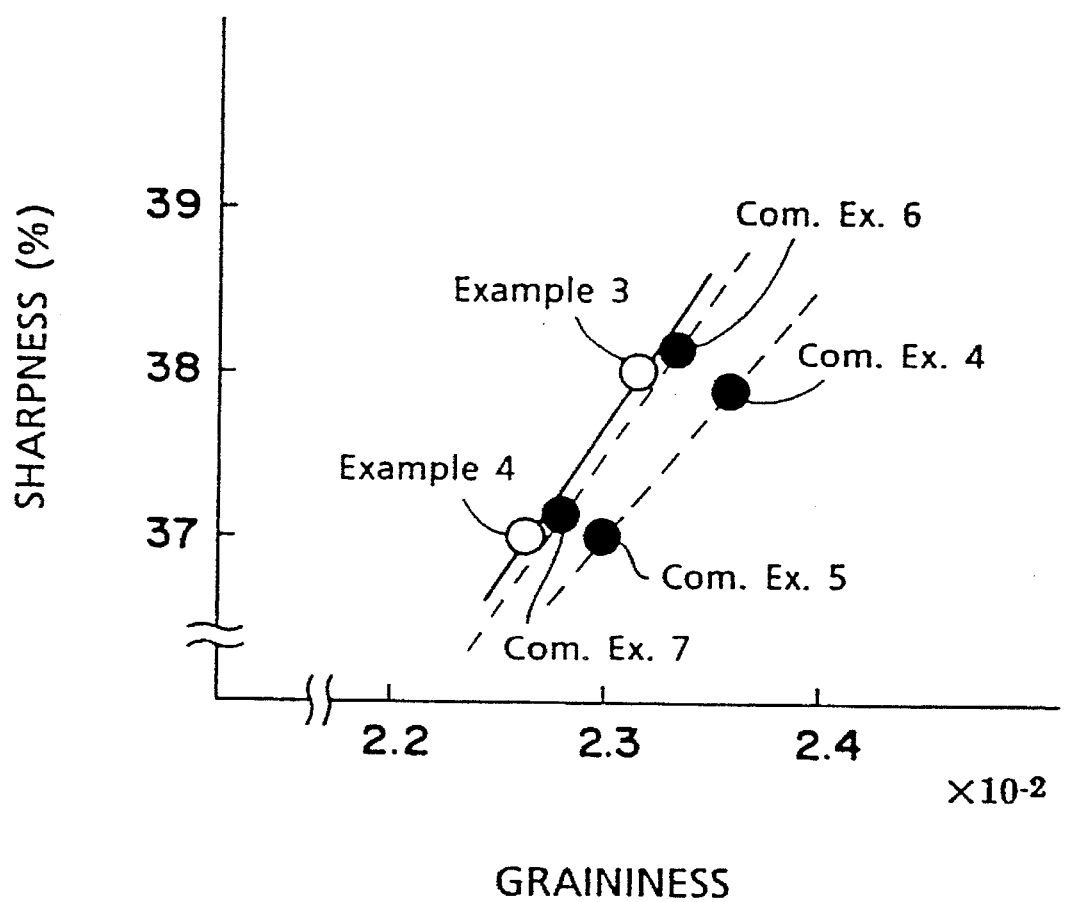

The results are graphically shown in FIG. 10.

As is apparent from FIG. 10, the radiation image storage panels prepared by the present invention give improved image quality, as compared with the radiation image storage panels prepared with no preheating under the same feeding conditions. Further, it is understood that the image quality provided by the radiation image storage panel prepared by the present invention can be obtained by the process with no preheating only when the feet rate is decreased to one tenth (1/10).

EXAMPLE 5

The procedure of Example 1 was repeated except that the compression processing was performed using one set of calender rolls, a torque roll, and a tension pick-up roll as shown in FIG. 7 at a roll temperature of 80° C. (same for the two calender rolls), a roll pressure of 500 kg/cm$^2$, a feed rate of 1 m/min., and a tension (applied to the phosphor sheet) of 30 g/cm.

Thus, a radiation image storage panel having the phosphor layer on a support was prepared.

EXAMPLE 6

The procedure of Example 5 was repeated except that the tension applied to the phosphor was changed to 150 g/cm, to prepare a radiation image storage panel having the phosphor layer on a support.

EXAMPLE 7

The procedure of Example 5 was repeated except that the tension applied to the phosphor was changed to 500 g/cm, to prepare a radiation image storage panel having the phosphor layer on a support.

Comparison Example 8

The procedure of Example 5 was repeated except that the calender roll 61 (calender roll 61a, calender roll 61b) having no tension applying means was used. A phosphor sheet 63 was placed on a support 65 to pass through between the two rolls to prepare a radiation image storage panel having the phosphor layer on a support.

Evaluation of Radiation Image Storage Panel

The radiation image storage panel prepared in the above examples showed the following dimension changes.

|  | Ex. 5 | Ex. 6 | Ex. 7 | Com. Ex. 8 |
| --- | --- | --- | --- | --- |
| Tension (g/cm) | 30 | 150 | 500 | 0 |
| Thickness (μm) |  |  |  |  |
| Before compression | 300 | 400 | 500 | 270 |
| After compression | 200 | 210 | 195 | 200 |
| Elongation ratio (%) | 7 | 40 | 86 | 2 |

The radiation image storage panels prepared as

The radiation image storage panels prepared as described above were evaluated on the quality of the image according to the same tests as described above.

Figure 11:
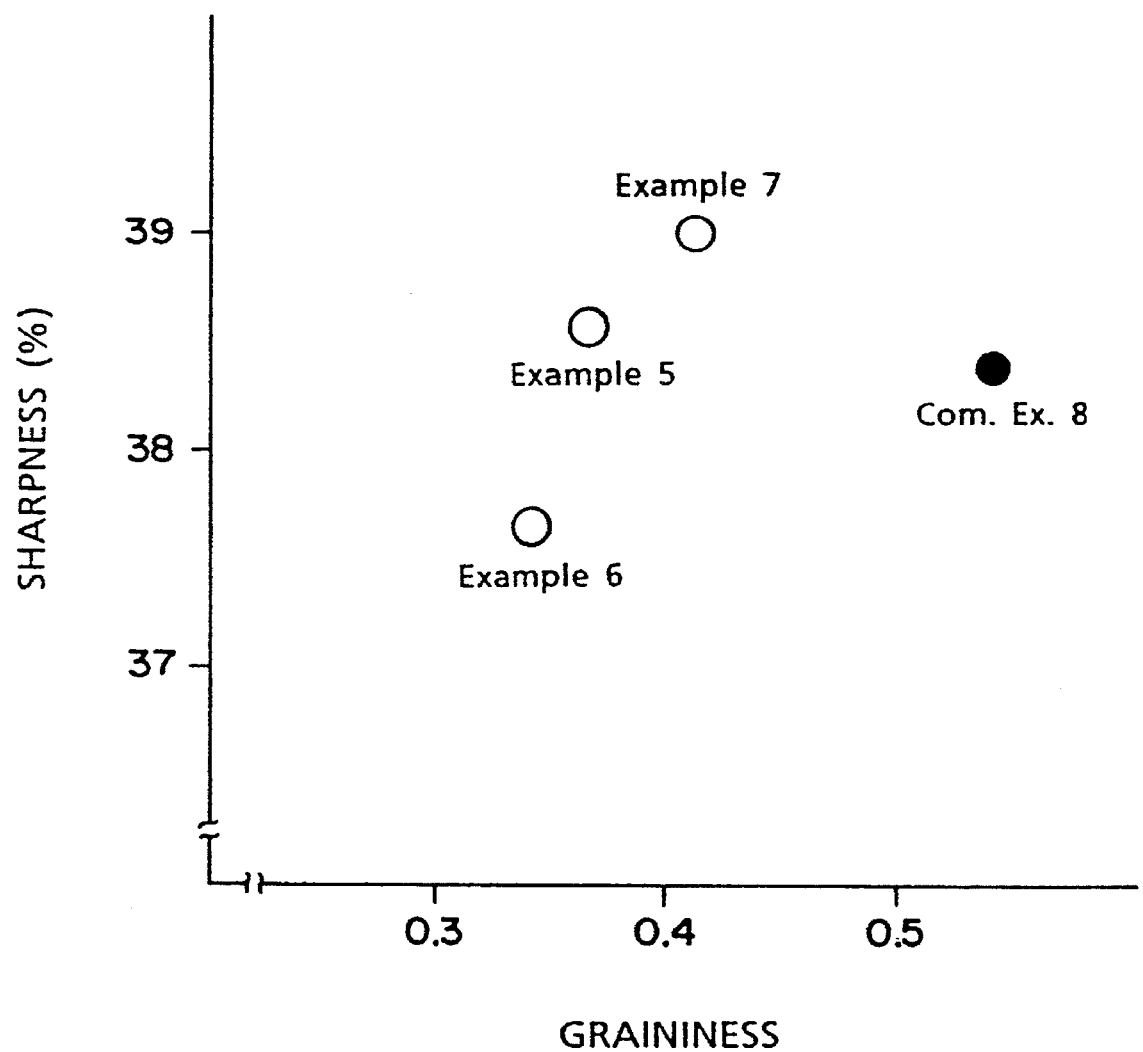

The results are graphically shown in FIG. 11.

As is apparent from FIG. 11, the radiation image storage panels prepared by the present invention give improved graininess, as compared with the radiation image storage panels prepared with no tension applied, while the sharpness is kept on the same level.

We claim:

1. A process for the preparation of a radiation image storage panel comprising the steps of:

forming a phosphor sheet comprising a binder and a stimulable phosphor; and compressing the phosphor sheet on a support under heating up to a temperature of not lower than softening point or melting point of the binder by means of a heated calender roll, keeping the phosphor sheet under tension in the range of 10–700 g/cm.

2. The process as defined in claim 1, wherein the binder is a thermoplastic elastomer.

3. The process as defined in claim 1, wherein the tension applied to the phosphor sheet is in the range of 20 to 500 g/cm.

4. The process as defined in claim 1, wherein the tension is applied to the phosphor sheet to give an elongation ratio in the range of 1 to 150%.

5. The process as defined in claim 1, wherein the tension is applied to the phosphor sheet to give an elongation ratio in the range of 5 to 50%.

6. The process as defined in claim 1, wherein the binder is a thermoplastic elastomer and has a softening point of 30° to 200° C.

* * * * *